3,257,466
LINEAR DIMERS OF PERFLUOROALKYL PERFLUOROVINYL ETHERS

Thompson Arthur Mashburn, Jr., Fairfax, Del., assignor to E. I. du Pont de Nemours and Company, Wilmington, Del., a corporation of Delaware
No Drawing. Filed Dec. 1, 1961, Ser. No. 156,536
7 Claims. (Cl. 260—615)

The present invention relates to novel perfluorinated unsaturated ethers, and more particularly, to linear dimers of perfluoroalkyl perfluorovinyl ethers.

Fluorinated compounds, in general, are well known for their chemical inertness and their ability to withstand elevated temperatures. These characteristics are essential for applications employing fluorinated high polymers as well as for those wherein the fluorinated compounds are used as heat-transfer or dielectric media, lubricants and solvents. Because of the complexity of preparation and/or the economic infeasibility of the preparative process for the required fluorinated materials some of the above applications cannot be served.

It is an object of the present invention to prepare fluorinated unsaturated ethers which can be used as solvents, dielectric or heat-transfer media and lubricants. It is a further object to prepare fluorinated unsaturated ethers which are stable over a wide range of temperatures. A still further object is to prepare these materials by means of an economically feasible process. Other objects will become apparent hereinafter.

The objects of the present invention are achieved by providing a class of novel linear dimers of perfluoroalkyl perfluorovinyl ethers. These dimers may be designated structurally as 2,4-bis-perfluoroalkoxyperfluoro-2-butenes. Dimers of perfluoroalkyl perfluorovinyl ethers are not unknown in the art. U.S. Patent 2,982,786 describes the dimerization of said ethers by heating to 100–350° C. in an inert atmosphere in the absence of polymerization initiators. The dimers formed by such a process are cyclic in nature, however, being derivatives of cyclobutane, whereas those formed by the present invention are solely of the linear variety. It has been discovered in the present invention that the linear dimers can be formed preferentially in an inert environment through use of specific base type catalysts. Further, the synthesis of the linear dimers of the present invention is unusual in that the addition across the double bond does not follow a conventional addition mechanism. It is apparent from the structure of the product that a rearrangement and/or an isomerization, likewise, must participate in the reaction.

A variety of base type catalysts may be used to effect the dimerization of the vinyl ether. Although their activities vary, such materials as alkali metal fluorides, chlorides and bromides, monovalent non-alkali metal fluorides, especially silver and thallium fluorides, quaternary ammonium halides containing alkyl groups having 1 to 18 carbon atoms and basic carbon blacks all serve as catalysts for the dimerization. The alkali metal fluorides, particularly cesium fluoride, are the preferred catalysts.

The perfluoroalkyl perfluorovinyl ethers useful in the present invention may contain a fluoroalkyl substituent of any chain length, but generally, because of more facile methods of preparation, the fluoroalkyl chain contains from 1 to 10 carbon atoms. The dimerization is effected by contacting the monomeric ether in an inert environment with 0.001–20 weight percent, preferably 0.1–10 percent, of one of the aforementioned catalysts. The time of reaction will depend upon both the particular catalyst and monomer used as well as the reaction temperature and pressure. The pressure will vary with the monomer and temperature selected when the reaction is carried out autogenously, although increased pressures, per se, favor the dimerization. The reaction normally is carried out at elevated temperatures, in the range 25–200° C. and especially 50–1000° C., to reduce the reaction time. The 100° C. maximum is preferred, particularly in batch reactions, to avoid side reactions, for example rearrangements, although these may be minimized at the higher temperatures by conducting short contact time continuous reactions.

Various modifications of the process for the preparation of the dimers of this invention will occur to those skilled in the art. For example, a non-reactive solvent such as propane, petroleum ether or toluene may be utilized. Ethers such as diethyl ether and alkyl ethers of ethylene glycol and diethylene glycol, although applicable, are less desirable because of their interaction, thus providing unnecessary by-products, particularly above 100° C. Dimethylformamide and dimethylacetamide, also, may be used if the temperature is maintained below 100° C. to minimize their participation as a reactant. In order to retard polymerization of the perfluoroalkyl perfluorovinyl ethers during the reaction, it may be desirable to conduct the dimerization in the presence of a free radical polymerization inhibitor.

The following examples are intended to demonstate but not limit the usefulness of the invention.

Example I

To 0.5 gram cesium fluoride and 2 cc. dry dimethylformamide in a nitrogen-flushed Carius tube is added 5 grams of perfluoromethyl perfluorovinyl ether. The tube, after sealing, is heated to 55–75° C. for 3 hours with agitation. After cooling and release of pressure the contents are separated by distillation under nitrogen to yield 3 grams of 2,4-bis-trifluoromethoxyperfluoro-2-butene, B.P. 85–86° C. at atmospheric pressure. Infrared and nuclear magnetic resonance spectra confirm the structure of the designated product. Elemental analyses indicate: carbon 21.8, 21.9%, fluorine 65.9, 65.6%; calculated: carbon 21.7, fluorine 68.7.

Example II

Example I is repeated reducing the volume of dry dimethylformamide to 0.1 cc. and employing a reaction time of 4 hours. The product is recovered as above and weighs 3.75 grams.

Example III

Example I is repeated using 1 cc. of dry dimethylacetamide in place of the formamide. A similar yield of product is obtained.

Example IV

A 320 cc. stainless steel, nitrogen-flushed, pressure tube is charged with 12 grams cesium fluoride, 100 cc. dimethyl ether of ethylene glycol and 60 grams perfluoromethyl perfluorovinyl ether. The sealed tube is heated to 150° C. with shaking for two hours. After cooling and release of off-gas the lower liquid layer is separated, then distilled under nitrogen to yield the same product as above.

Example V

To 0.5 gram potassium fluoride and 2 cc. dry dimethylformamide in a nitrogen-flushed Carius tube is added 5 grams of perfluoromethyl perfluorovinyl ether. The tube, after sealing, is heated to 55–75° C. for 3 hours with agitation. After cooling and release of pressure the contents are separated by distillation under nitrogen to yield about 3 grams of the aforesaid linear dimer.

Example VI

A nitrogen-flushed Carius tube is charged with 0.5 gram thallium fluoride, 2 cc. dry dimethylformamide and 5 grams perfluoromethyl perfluorovinyl ether. After sealing the experiment is completed as in Example I to give a similar yield of the dimer.

Example VII

Example VI is repeated using tetraethylammonium chloride in place of thallium fluoride. The product is recovered as previously described.

Example VIII

Example I is repeated using various perfluoroalkyl perfluorovinyl ethers wherein the alkyl group varies in chain length between two and seven carbon atoms. The corresponding linear perfluoroalkyl dimers are obtained.

The unsaturated dimers of the present invention provide a useful class of solvents. The higher boiling members thereof may be used as heat-transfer media, especially after being treated with conventional fluorinating agents to saturate the double bond. The saturated materials, also, serve as dielectric media. The following is given to demonstrate the usefulness of an unsaturated linear dimer as a solvent. Into an 80 cc. nitrogen-flushed, stainless steel, pressure tube is charged 30 cc. 2,4-bis-trifluoromethoxyperfluoro-2-butene, 30 grams hexafluoropropylene, 10 grams tetrafluoroethylene and 0.0001 mole dinitrogen difluoride. The mixture is heated to 75° C. under autogenous pressure with shaking. After two hours the tube is cooled and its contents are discharged and filtered. After suitable washing and drying there is recovered 9.5 grams of a copolymer of tetrafluoroethylene and hexafluoropropylene containing 6 mole percent bound hexafluoropropylene.

I claim:

1. A class of compounds having the formula

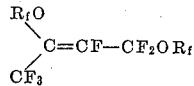

wherein $R_f$ is a perfluoroalkyl group having 1 to 10 carbon atoms.

2. 2,4-bis-trifluoromethoxyperfluoro-2-butene.

3. The process by which the class of compounds of claim 1 is prepared, said process comprising contacting a perfluoroalkyl perfluorovinyl ether at 25–200° C. in an inert environment with 0.001–20 weight percent of a catalyst selected from the group consisting of alkali metal fluorides, silver fluoride, thallium fluoride, and tetraalkyl ammonium halides wherein the alkyl groups have from 1 to 18 carbon atoms.

4. The process by which the class of compounds of claim 1 is prepared, said process comprising contacting a perfluoroalkyl perfluorovinyl ether at 50–100° C. in an inert environment with 0.1–10 weight percent of a catalyst selected from the group consisting of alkali metal fluorides, silver fluoride, thallium fluoride, and tetraalkyl ammonium halides wherein the alkyl groups have from 1 to 18 carbon atoms.

5. A process according to claim 3 wherein the reaction is carried out in the presence of a solvent.

6. The process by which the class of compounds of claim 1 is prepared, said process comprising contacting a perfluoroalkyl perfluorovinyl ether at 25–200° C. in an inert environment with 0.001–20 weight percent of an alkali metal fluoride.

7. The process by which the class of compounds of claim 1 is prepared, said process comprising contacting a perfluoroalkyl perfluorovinyl ether at 25–200° C. in an inert environment with 0.001–20 weight percent of cesium fluoride.

References Cited by the Examiner

UNITED STATES PATENTS

| 2,522,566 | 9/1950 | Chaney | 260—614 X |
| 2,935,534 | 5/1960 | Hoaglin et al. | 260—615 |

References Cited by the Applicant

"Encyclopedia of Chemical Technology," volume 3, Kirk and Othmer, 1949, pages 51–56.

LEON ZITVER, *Primary Examiner.*

CHARLES B. PARKER, *Examiner.*

B. HELFIN, H. T. MARS, *Assistant Examiners.*